Dec. 18, 1962   R. L. SKINNER, SR   3,069,175
SEAL
Filed Aug. 17, 1959
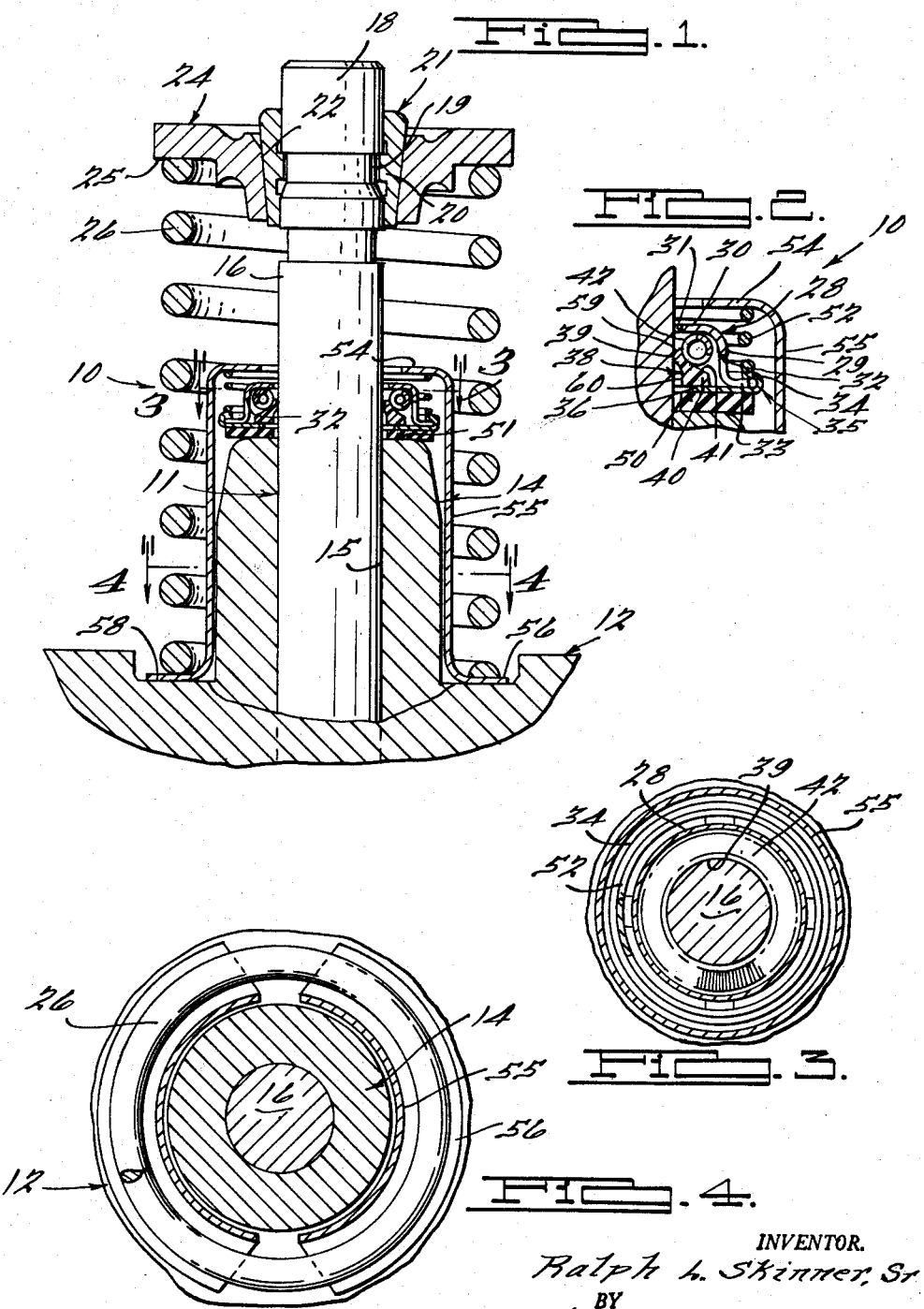
INVENTOR.
Ralph L. Skinner, Sr
BY
Harness, Dickey & Pierce,
ATTORNEYS.

United States Patent Office 3,069,175
Patented Dec. 18, 1962

3,069,175
SEAL
Ralph L. Skinner, Sr., North Hollywood, Calif., assignor of one-half to Robert T. Skinner, Flint Ridge, Calif.
Filed Aug. 17, 1959, Ser. No. 834,070
6 Claims. (Cl. 277—48)

This invention relates to an improved seal for restricting the passage of fluid along a shaft.

Reciprocating valves for the admission of fuel and air into the combustion chambers of an internal combustion engine are generally slidably supported in valve guides in the cylinder head of the engine. Ordinarily each valve is actuated by a rocker arm or cam shaft and is lubricated to prevent excessive wear. During the intake cycle of the engine, a pressure differential is created between the combustion chamber and the air mass surrounding the rocker arm assembly that tends to force lubricating oil through the valve guide and around the valve stem into the combustion chamber where it is consumed in the combustion process and discharged with the exhaust gases. Sometimes, initially, and almost invariably when the stem and guide become worn, the valve stem tends to move eccentrically or whip with respect to the valve guide due to the lateral or eccentric forces transmitted thereto from the rocker arm or cam shaft. Seals known to the art do not satisfactorily accommodate this lateral or eccentric movement of the valve stem and often fail prematurely thereby permitting the free passage of oil around the valve stem and into the combustion chamber, resulting in excessive oil consumption.

The seal of the present invention is free-floating laterally with respect to the supporting structure therefor, so as to effectively seal the valve stem against the passage of oil, despite the eccentric or whipping movement thereof.

Accordingly, one object of the present invention is to provide an improved seal for a shaft that prevents the passage of fluid between the shaft and a support therefor.

Another object is to provide a seal for a shaft subjected to rotation, reciprocation or vibration.

Another object is to provide a seal for a shaft that is free-floating laterally with respect to the seal support so as to provide a positive seal against the passage of fluid along the shaft upon the occurrence of lateral movement or whip of the shaft.

Another object is to provide an improved supporting structure for a seal that enables the seal to cooperate with a shaft to seal the shaft relatively effectively against the passage of fluid.

Other objects and advantages of the present invention will become apparent from the following detailed description wherein reference is made to the drawings, in which:

FIGURE 1 is a fragmentary sectional view of a seal and a supporting structure therefor, in operative association with a valve and valve guide of an internal combustion engine;

FIG. 2 is a fragmentary cross-sectional view of the seal of FIG. 1, enlarged for clarity;

FIG. 3 is a cross-sectional view taken substantially along the line 3—3 of FIG. 1; and FIG. 4 is a cross-sectional view taken substantially along the line 4—4 of FIG. 1.

For the purpose of explaining the seal of the present invention, an application thereof to a reciprocating valve of an internal combustion engine is described herein. It will be obvious that the seal is applicable to other types of rotating reciprocating or statically mounted shafts and that it has particular utility in these situations when the shaft is subjected to lateral movement.

A seal in accordance with the present invention comprises a housing having a pair of spaced apertures aligned on a central axis for the acceptance of a shaft. A sealing element is disposed within the housing between the apertures and has an opening for the acceptance of the shaft in slidable engagement. A flat support surface on the housing slidably supports the element for free lateral movement with respect to the housing, thereby permitting movement of the element out of alignment with the apertures. A garter spring cooperates with the housing to bias the sealing element against the shaft and support surface, concurrently, independently of the lateral position of the sealing element.

Referring to FIG. 1, a seal assembly 10 is shown in operative association with a valve 11 and a cylinder head 12 of an internal combustion engine (not shown). The cylinder head 12 is provided with a cylindrical valve guide 14 having a bore 15 extending therethrough for the slidable support of a valve stem 16 of the valve 11. A lower end (not shown) of the valve 11 projects into the combustion chamber of the internal combustion engine and is provided with a valve head of conventional configuration (not shown).

An upper end portion 18 of the valve stem 16 is provided with a peripheral recess 19 for the acceptance of a complementary shoulder 20 on a tapered valve keeper 21. The valve keeper 21 is seated in a suitably correspondingly tapered bore 22 in a valve cap 24. The valve cap 24 has a radially outwardly extending peripheral flange 25 against which a valve spring 26 operates to bias the valve 11 normally upwardly to a closed position, as seen in the drawings.

Because lubricating oil is generally employed to reduce friction in a rocker arm or cam shaft assembly (not shown) engageable with the upper end portion 18 of the valve 11 to bias the valve 11 downwardly to an open position, the stem 16 of the valve 11 is exposed to oil. A pressure differential between the opposite ends of the valve 11, upon an intake stroke of a piston (not shown) tends to force oil downwardly along the valve stem 16 and through the bore 15 of the valve guide 14 into the combustion chamber (not shown).

In accordance with the present invention, the seal assembly 10 is disposed about the valve stem 16 to restrict the passage of oil between the stem 16 and the guide 14. The preferred form of sealing assembly 10 comprises an inverted cup-shaped housing 28 having a generally cylindrical longitudinal wall 29 and a transversely extending end wall 30 at the upper end thereof. The end wall 30 has a central aperture 31 for the passage of the valve stem 16. The longitudinal wall 29 has an aperture 32 therein to permit drainage of oil outwardly of the housing 28.

The housing 28 has a radially outwardly extending peripheral flange 33 at the lower end thereof that is engaged under an inwardly folded peripheral flange 34 on a seal support disc 35. The seal support disc 35 has a central aperture 36 for the acceptance of the valve stem 16. The apertures 31 and 36 in the end wall 30 and disc 35, respectively, are appreciably larger than the diameter of the valve stem 16 to provide for lateral movement of the valve stem 16 without imparting lateral movement to the housing 28.

An annular sealing ring 38, preferably of nylon or Teflon, is disposed within the housing 28 about the valve stem 16. The sealing ring 38 has a lip portion 39 in engagement with the valve stem 16 in an initially snug or interference fit. The lip portion 39 is of relatively small area in order to reduce heating, due to friction between the lip 39 and the valve stem 16, to a minimum. The sealing ring 38 has a flat transverse under or bottom surface 40 that seats on and is slidably supported by the disc 35. This flatwise engagement of the face 40 with the disc 35 permits the sealing ring 38 to move laterally of the housing 28 without obstruction, yet provides a fluid seal between the sealing ring 38 and the housing 28. The largest or outside diameter of the sealing ring 38 is substantially less than the inside diameter of the longitudinal wall 29 of the housing 28 to allow for free movement of the sealing ring 38 transversely of the housing 28. The transverse surface 40 of the sealing ring 38 is free from axial projections that could restrict lateral movement of the sealing ring 38 on the flat surface of the disc 35. This is a distinct improvement over seals known to the art that are limited in lateral movement by interference between the seal and its supporting structure.

The sealing ring 38 has a beveled surface 41 that extends between the seating face 40 and the lip portion 39 for engagement by a garter spring 42. The garter spring 42 biases the lip portion 39 of the seal 38 radially inwardly against the valve stem 16 to maintain a snug fit therebetween to preclude the passage of oil. The garter spring 42 also resists radial expansion and distortion of the seal 38 due to heating thereof. The end wall 30, disc 35 and beveled surface 41 are so related to the diameter of the garter spring 42 that the garter spring 42 engages the end wall 30 and beveled surface 41 to hold the bottom face 40 of the seal 38 in slidable sealing engagement with the housing disc 35. Axial movement of the spring 42 is restricted within the cup-shaped housing 28 by the engagement thereof with the transverse end wall 30 of the housing 28 and the beveled surface 41 on the seal 38. The flat seating surface 40, in addition to effecting a seal between the seal 38 and the housing 28, prevents the sealing ring 38 from cocking with respect to the housing 28, thereby insuring that the sealing lip 39 engages the valve stem 16 in close sealing engagement. Due to the good antifriction properties of Teflon etc., the pressure of the lip portion 39 does not prevent easy sliding movement between sealing element 38 and the valve stem 16 or disc 35.

A washer 50 of resilient material, for example rubber, is positioned between the seal support disc 35 of the housing 28 and an upper surface 51 of the valve guide 14 and functions as a seal between the housing 28 and the valve guide 14. The washer 50 is biased against the upper surface 51 of the valve guide 14 by a helical compression spring 52 that extends between the inwardly folded flange 34 on the disc 35 of the housing 28 and a radially inwardly extending flange 54 on a tubular retainer cup 55.

The retainer cup 55 substantially encloses the valve guide 14, spring 52 and housing 28 and maintains the washer 50, housing 28, and spring 52 in operative alignment with the valve stem 16 and valve guide 14. The retainer cup 55 has a radially outwardly extending flange 56 on the lower end thereof, as seen in the drawing, that is accepted within a complementary counterbore 58 in the cylinder head 12. The valve spring 26 operates in compression between the flange portion 56 and the flange 25 on the valve cap 24 and, in addition to biasing the valve 11 upwardly to a normally closed position, maintains the retainer cup 55 within the counterbore 58 and in fixed relation with respect to the cylinder head 12.

The sealing ring 38 has a pair of spaced annular recesses 59 and 60 on opposite sides of the lip portion 39 thereof that define the area of contact of the sealing ring 38 with the valve stem 16. In this manner, the unit contact pressure of the lip portion 39 is maintained relatively high, yet the heat due to friction is kept to a minimum.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:
1. A seal for a shaft comprising
an annular housing
 having a pair of axially spaced radially extending end walls with aligned apertures therein, respectively, relatively larger than the shaft,
an annular seal element
 within said housing of generally truncated conical radial cross section having a generally conical inner peripheral surface and a generally conical outer peripheral surface extending divergently from an annular lip portion engageable with the shaft in sealing relationship toward a radially extending substantially flat sealing face spaced radially outwardly and axially from the lip portion of said seal element and engageable with one of the end walls of said housing in laterally slidable sealing engagement, and
a garter spring
 surrounding said seal element and engageable with the generally conical outer peripheral surface thereof and with the other of the end walls of said housing for biasing said seal element radially inwardly against said shaft and axially toward the one end wall of said housing, concomitantly, the end walls of said housing extending radially outwardly beyond the seating face on said seal element and said garter spring whereby said seal element and garter spring are free to move laterally relative to said housing upon lateral movement of the shaft.

2. A seal for a shaft comprising
an annular housing
 having a pair of axially spaced radially extending end walls with an axially extending wall therebetween at the radially outer periphery thereof,
an annular seal element
 within said housing of generally truncated conical radial cross section having a generally conical inner peripheral surface and a generally conical outer peripheral surface extending divergently from an annular lip portion engageable with the shaft in sealing relationship toward a radially extending substantially flat sealing face spaced radially outwardly and axially from the lip portion of said seal element and engageable with one of the end walls of said housing in laterally slidable sealing engagement, and
a garter spring
 surrounding said seal element and engageable with the generally conical outer peripheral surface thereof and with the other of the end walls of said housing for biasing said seal element radially inwardly against said shaft and axially toward the one end wall of said housing, concomitantly, the end walls of said housing extending radially outwardly beyond the seating face on said seal element and said garter spring whereby said seal element and garter spring are free to move laterally relative to said housing upon lateral movement of the shaft, the axially extending wall of said housing having an aperture therein communicating with the outer peripheral surface of said seal element to provide for fluid flow outwardly of said housing.

3. A seal comprising
an annular housing
 adapted to receive and surround a member to be sealed and having spaced end walls,
an annular seal element
 of fluorocarbon resin material in said housing, said element having a bottom seating surface supported by and freely slidable on one of said end walls, and cooperative inner annular and outer beveled surfaces defining a lip portion adapted to surround and circumferentially seal said member, and a garter spring
surrounding said sealing lip confined between and bearing against the outer beveled surface of said sealing element and the other end wall of said housing, said spring being normally tensioned to exert a constrictive force against the beveled surface of said sealing element whereby to urge said bottom sealing surface and said sealing lip simultaneously against and in sealing relation to said one end wall and said member, said sealing element having a relatively thin and yieldable intermediate annular section responsive to the constrictive action of said spring to position said lip in effective sealing relationship with said member, and said end walls extending radially outwardly beyond said sealing element and said spring sufficiently to provide radial clearance therefor and to permit both said element and said spring to be freely universally movable radially in said housing and on said walls to accommodate lateral motion or whip of said member while maintaining an effective seal thereagainst.

4. A seal comprising
an annular housing
adapted to receive and surround a member to be sealed and having spaced end walls, an annular sealing element
of fluorocarbon resin material in said housing, said element having a bottom seating surface supported by and freely slidable on one of said end walls, and cooperative inner annular and outer beveled surfaces defining a lip portion adapted to surround and circumferentially seal said member, and a garter spring
surrounding said sealing lip confined between and bearing against the outer beveled surface of said sealing element and the other end wall of said housing, said spring being normally tensioned to exert a constrictive force against the beveled surface of said sealing element whereby to urge said bottom sealing surface and said sealing lip simultaneously against and in sealing relation to said one end wall and said member, the inner annular surface of said sealing element being recessed below said sealing lip to define a relatively thin and flexible intermediate annular section adapted to yield under said spring to assure an effective sealing relationship between said lip and said member, and said end walls extending sufficiently radially outwardly beyond said sealing element and said spring to provide radial clearance therefor whereby both said element and said spring are freely universally movable radially in said housing and on said walls to accommodate lateral motion or whip of said member while maintaining an effective seal thereagainst.

5. A valve stem seal comprising
an annular housing
adapted to receive and surround a valve stem and having spaced upper and lower end walls provided with central apertures through which said valve stem extends, an annular sealing element
in said housing, said element having a bottom sealing surface supported by and freely slidable on said lower end wall, and cooperative inner annular and outer beveled surfaces defining a lip portion adapted to surround and circumferentially seal said valve stem, and a garter spring
surrounding said sealing lip confined between and bearing against the outer beveled surface of said sealing element and the upper end wall of said housing, said spring being normally tensioned to exert a constrictive force against the beveled surface of said sealing element whereby to urge said bottom sealing surface and said sealing lip simultaneously against and in sealing relation to said lower end wall and said valve stem, said end walls extending sufficiently laterally outwardly beyond said sealing element and said spring to provide outer radial clearance therefor whereby both said element and said spring are freely uniformly movable in said housing and on said upper and lower end walls to accommodate lateral motion or whip of said valve stem in use, and said housing having a bottom oil vent through which oil entering the seal is discharged from said housing.

6. A seal comprising
an annular housing
adapted to receive and surround a member to be sealed and having spaced end walls, an annular sealing element
of fluorocarbon resin material in said housing, said element having a bottom seating surface slidably supported by one of said end walls, and cooperative inner annular and outer beveled surfaces defining a lip portion adapted to surround and circumferentially seal said member, and a garter spring
surrounding said sealing lip confined between and bearing against the outer beveled surface of said sealing element and the other end wall of said housing, said spring being normally tensioned to exert a constrictive force against the beveled surface of said sealing element whereby to urge said bottom sealing surface and said sealing lip simultaneously against and in sealing relation to said one end wall and said member, and said end walls extending radially outwardly beyond said sealing element and said spring sufficiently to provide radial clearance therefor so that both said element and said spring are freely universally movable radially in said housing and on said walls to accommodate lateral motion or whip of said member while maintaining an effective seal thereagainst.

References Cited in the file of this patent

UNITED STATES PATENTS

| | | |
|---|---|---|
| 1,370,346 | Nelson | Mar. 1, 1921 |
| 1,421,802 | Marshall | July 4, 1922 |
| 1,561,378 | Trautner et al. | Nov. 10, 1925 |
| 1,674,762 | Clark | June 26, 1928 |
| 2,186,537 | Salisbury | Jan. 9, 1940 |
| 2,208,482 | Victor | July 16, 1940 |
| 2,639,928 | Robbins | May 26, 1953 |
| 2,651,534 | Kosatka | Sept. 8, 1953 |
| 2,742,306 | Kelso et al. | Apr. 17, 1956 |
| 2,859,055 | Hupp | Nov. 4, 1958 |

FOREIGN PATENTS

| | | |
|---|---|---|
| 342,542 | Italy | Aug. 7, 1936 |